United States Patent
Ishikawa et al.

(10) Patent No.: US 8,137,864 B2
(45) Date of Patent: Mar. 20, 2012

(54) FUEL CELL FORMED WITH METAL SEPARATORS

(75) Inventors: Eri Ishikawa, Utsunomiya (JP); Seiji Sugiura, Utsunomiya (JP); Mikihiko Kimura, Gyoda (JP); Akihiro Nonogaki, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 761 days.

(21) Appl. No.: 12/187,801

(22) Filed: Aug. 7, 2008

(65) Prior Publication Data

US 2009/0042086 A1    Feb. 12, 2009

(30) Foreign Application Priority Data

Aug. 9, 2007    (JP) .................................. 2007-207544

(51) Int. Cl.
    *H01M 8/04* (2006.01)
(52) U.S. Cl. ........................................................ 429/514
(58) Field of Classification Search .......... 429/452–457, 429/512, 514
See application file for complete search history.

(56) References Cited

U.S. PATENT DOCUMENTS

| | | | | |
|---|---|---|---|---|
| 6,153,326 A | * | 11/2000 | Matsukawa et al. | 429/492 |
| 2003/0087140 A1 | * | 5/2003 | Kikuchi et al. | 429/26 |
| 2003/0150162 A1 | * | 8/2003 | Inagaki et al. | 48/195 |
| 2005/0142414 A1 | | 6/2005 | Kimura et al. | |

FOREIGN PATENT DOCUMENTS

| | | |
|---|---|---|
| JP | 2003-323900 | 11/2003 |
| JP | 2005-267912 | 9/2005 |

* cited by examiner

*Primary Examiner* — Jerry Lorengo
*Assistant Examiner* — Carlos Barcena
(74) *Attorney, Agent, or Firm* — Nelson Mullins Riley & Scarborough LLP; Anthony A. Laurentano

(57) ABSTRACT

A fuel cell according to the present invention includes a power generation cell. The power generation cell is formed by sandwiching a membrane electrode assembly between a first metal separator and a second metal separator. An oxygen-containing gas flow field is formed on one surface of the first metal separator, and a coolant flow field is formed on the other surface of the first metal separator. The first metal separator includes a corrugated metal plate. A resin frame member is provided on one surface of the metal plate, and a rubber seal is provided on the other surface of the metal plate. An oxygen-containing gas supply passage, an oxygen-containing gas discharge passage, a coolant supply passage, a coolant discharge passage, a fuel gas supply passage, and a fuel gas discharge passage extend through the metal plate, the resin frame member, and the rubber seal.

5 Claims, 12 Drawing Sheets

PRIOR ART

FUEL CELL FORMED WITH METAL SEPARATORS

BACKGROUND OF THE INVENTION

1. Field of the Invention

The present invention relates to a fuel cell formed by sandwiching an electrolyte electrode assembly between a first metal separator and a second metal separator. The electrolyte electrode assembly includes a pair of electrodes, and an electrolyte interposed between the electrodes.

2. Description of the Related Art

For example, a solid polymer electrolyte fuel cell employs a solid polymer electrolyte membrane. The solid polymer electrolyte membrane is a polymer ion exchange membrane, and interposed between an anode and a cathode to form a membrane electrode assembly (electrolyte electrode assembly). Each of the anode and the cathode includes an electrode catalyst layer and porous carbon. The membrane electrode assembly is sandwiched between a pair of separators (bipolar plates). The membrane electrode assembly and the separators make up a power generation cell for generating electricity. In use, typically, a predetermined number of power generation cells are stacked together to form a fuel cell stack.

In the fuel cell, a flow field for supplying a fuel gas (hereinafter also referred to as the reactant gas) is formed on a separator surface facing the anode, and a flow field for supplying an oxygen-containing gas (hereinafter also referred to as the reactant gas) is formed on a separator surface facing the cathode. Further, a flow field for supplying a coolant is formed between separators for each power generation cell or for every predetermined number of power generation cells.

In general, the fuel cells adopts, so called, internal manifold structure in which fluid supply passages and fluid discharge passages extend through the separators in the stacking direction. The fluids, i.e., the fuel gas, the oxygen-containing gas, and the coolant are supplied from the respective fluid supply passages to the fuel gas flow field, the oxygen-containing gas flow field, and the coolant flow field, and then, discharged into the respective fluid discharge passages.

In the case where metal separators are used as the separators, since the fluid supply passages and the fluid discharge passages cannot be formed in the metal separators directly, various designs are adopted.

For example, as shown in FIG. 12, a fuel cell separator disclosed in Japanese Laid-Open Patent Publication No. 2005-267912 includes a central member 1 comprising a metal member, an outer member 2 comprising a resin member provided around the central member 1, and a joint member 3 comprising a resin member interposed between the central member 1 and the outer member 2. The joint member 3 at least covers an area near an outer edge 1a of the central member 1 and an inner edge 2a of the outer member 2. A channel 4 for oxygen and water produced in power generation is formed in the outer member 2, and ribs 5 are formed in the joint member 3 to cover the channel 4.

In the conventional technique, the outer member 2 is joined to the outer portion of the central member 1 through the joint member 3. For example, the joint member 3 is made of thermosetting resin such as silicone rubber. The outer member 2 is made of thermoplastic resin such as engineering plastic. That is, in the outer portion of the metal separator as the central member 1, the resin member as the outer member 2 and the resin joint member as the joint member 3 are provided. Therefore, in the presence of the resin joint member, the strength of the separator becomes low, and the durability of the separator becomes low undesirably.

SUMMARY OF THE INVENTION

The present invention has been made to solve the problems of this type, and an object of the present invention is to provide a fuel cell which makes it possible to effectively improve the strength and durability, and improve productivity.

The present invention relates to a fuel cell formed by sandwiching an electrolyte electrode assembly between a first metal separator and a second metal separator. The electrolyte electrode assembly includes a pair of electrodes, and an electrolyte interposed between the electrodes. At least the first metal separator includes a metal plate, and a resin frame member is provided on one surface of the metal plate, and a rubber seal is provided on the other surface of the metal plate.

In the present invention, the resin frame member is provided on one surface of the metal plate, and the rubber seal is provided on the other surface of the metal plate. In the structure, by the metal plate and the resin frame member, it is possible to effectively improve the overall strength of the metal separator, and improve durability thereof.

Further, since the rubber seal is provided only one surface of the metal plate, the number of molding operations of the rubber seal, e.g., using LIMS (Liquid Injection Molding System) required for the metal plate is reduced effectively. Accordingly, the production cost is reduced, and the entire metal separator can be produced efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
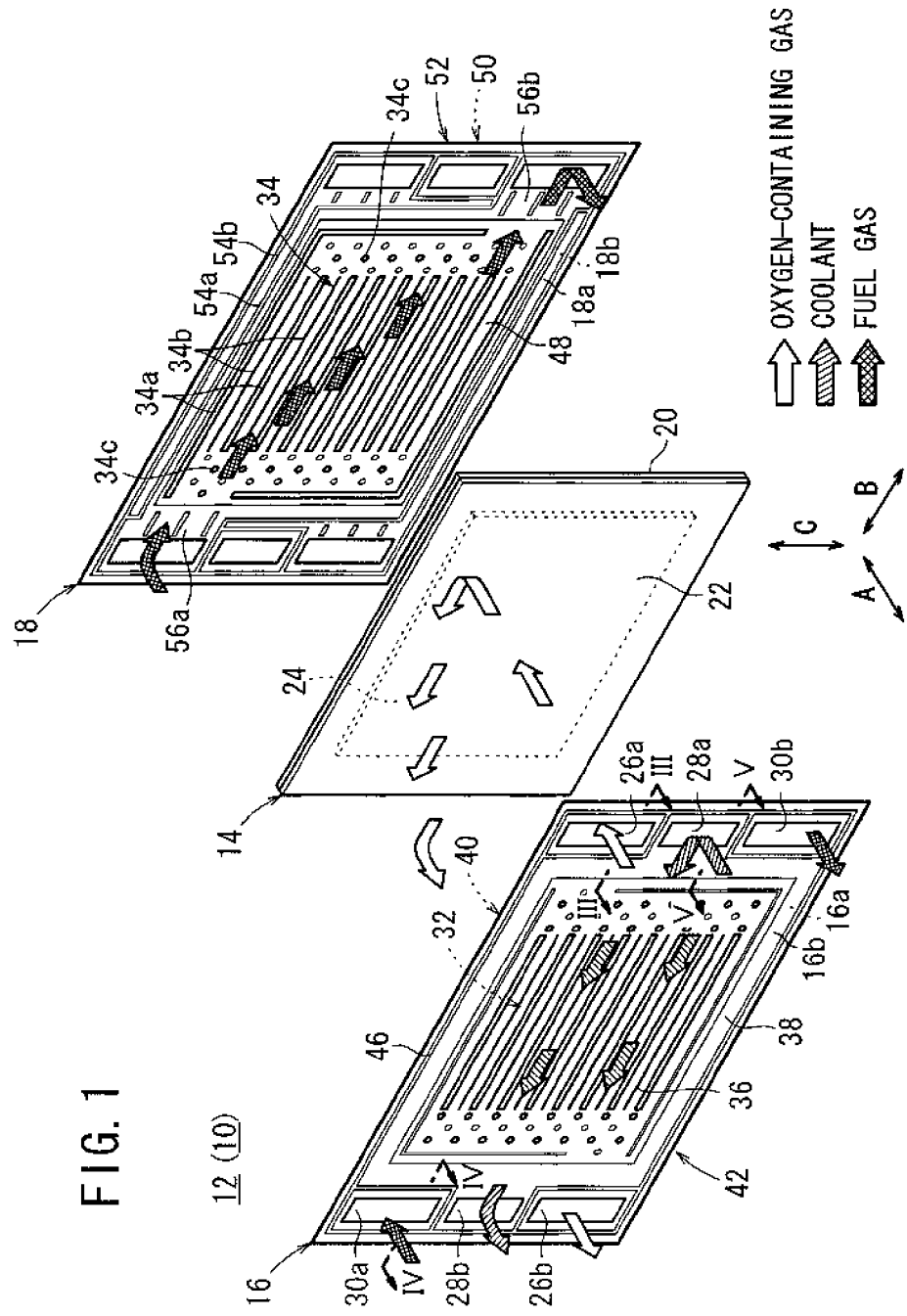
FIG. 1 is an exploded perspective view showing a power generation cell of a fuel cell according to a first embodiment of the present invention.

As shown in FIG. 1, a fuel cell 10 according to a first embodiment of the present invention is formed by stacking a plurality of power generation cells 12 in a direction indicated by an arrow A. Each of the power generation cells 12 includes a membrane electrode assembly (electrolyte electrode assembly) 14 and a first metal separator 16 and a second metal separator 18 sandwiching the membrane electrode assembly 14.

The membrane electrode assembly 14 comprises a cathode 22, an anode 24, and a solid polymer electrolyte membrane (electrolyte) 20 interposed between the cathode 22 and the anode 24. The solid polymer electrolyte membrane 20 is formed by impregnating a thin membrane of perfluorosulfonic acid with water, for example. Each of the cathode 22 and the anode 24 has a gas diffusion layer (not shown) such as a carbon paper, and an electrode catalyst layer (not shown) of platinum alloy supported on porous carbon particles. The carbon particles are deposited uniformly on the surface of the gas diffusion layer. The surface area of the anode 24 is smaller than the surface areas of the cathode 22 and the solid polymer electrolyte membrane 20.

At one end of the power generation cell 12 in a direction indicated by an arrow B, an oxygen-containing gas supply passage 26a for supplying an oxygen-containing gas, a coolant supply passage 28a for supplying a coolant, and a fuel gas discharge passage 30b for discharging a fuel gas such as a hydrogen-containing gas are arranged in a vertical direction indicated by an arrow C. The oxygen-containing gas supply passage 26a, the coolant supply passage 28a, and the fuel gas discharge passage 30b extend through the power generation cell 12 in the direction indicated by the arrow A.

At the other end of the power generation cell 12 in the direction indicated by the arrow B, a fuel gas supply passage 30a for supplying the fuel gas, a coolant discharge passage 28b for discharging the coolant, and an oxygen-containing gas discharge passage 26b for discharging the oxygen-containing gas are arranged in the direction indicated by the arrow C. The fuel gas supply passage 30a, the coolant discharge passage 28b, and the oxygen-containing gas discharge passage 26b extend through the power generation cell 12 in the stacking direction indicated by the arrow A.

Figure 2:
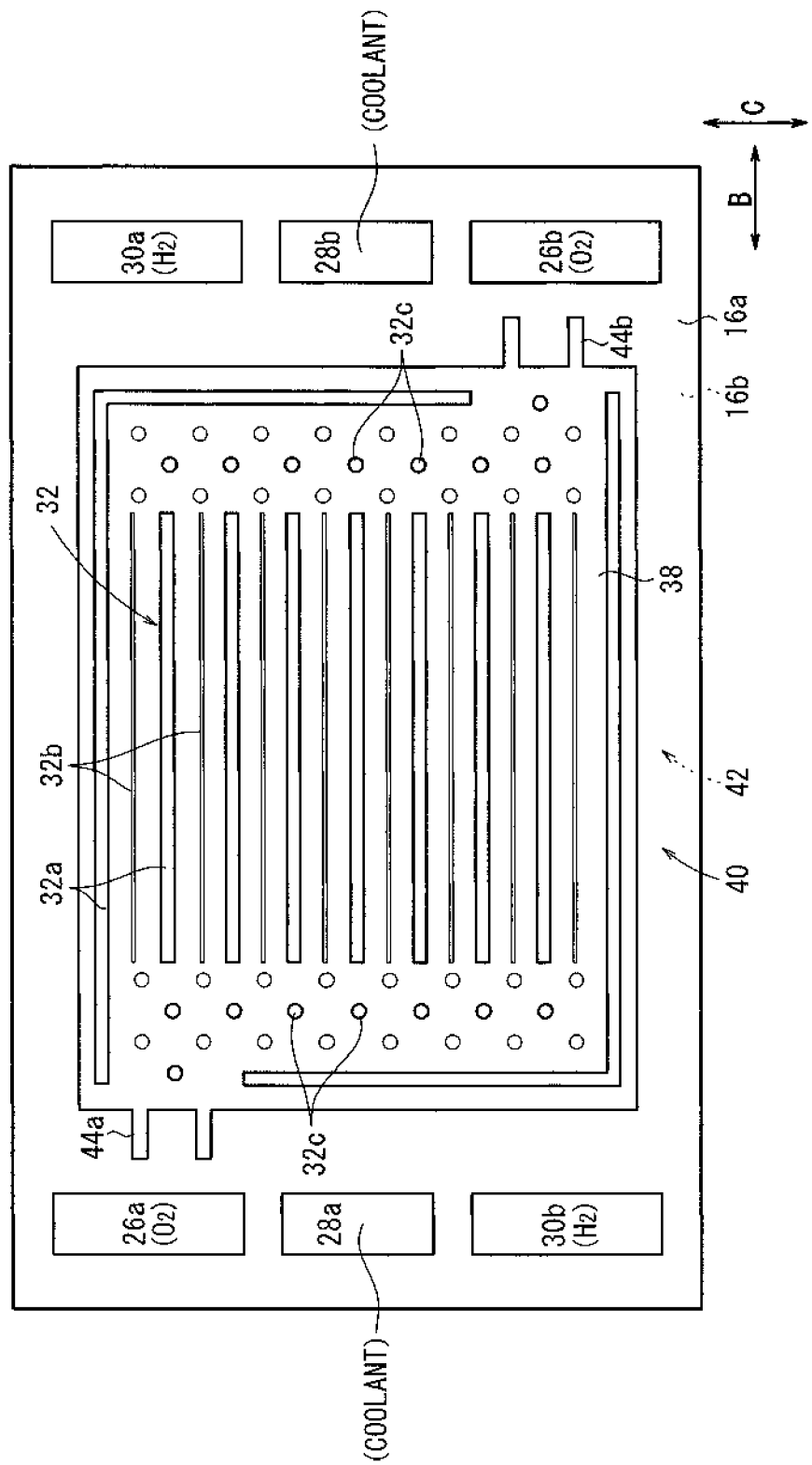
FIG. 2 is a front view showing a first metal separator of the power generation cell.

As shown in FIG. 2, the first metal separator 16 has an oxygen-containing gas flow field 32 on its surface 16a facing the membrane electrode assembly 14. The oxygen-containing gas flow field 32 has a straight pattern comprising ridges 32a and grooves 32b extending in the direction indicated by the arrow B, and provided alternately in the direction indicated by the arrow C. Bosses 32c are provided on opposite sides of the oxygen-containing gas flow field 32.

As shown in FIG. 1, the second metal separator 18 has a fuel gas flow field 34 on its surface 18a facing the membrane electrode assembly 14. The fuel gas flow field 34 has a straight pattern comprising ridges 34a and grooves 34b extending in the direction indicated by the arrow B, and provided alternately in the direction indicated by the arrow C. Bosses 34c are provided on opposite sides of the fuel gas flow field 34.

A coolant flow field 36 is formed by stacking a surface 16b of the first metal separator 16 and a surface 18b of the second metal separator 18, i.e., formed on back surfaces of the ridges and grooves forming the oxygen-containing gas flow field 32 and the fuel gas flow field 34.

Figure 3:
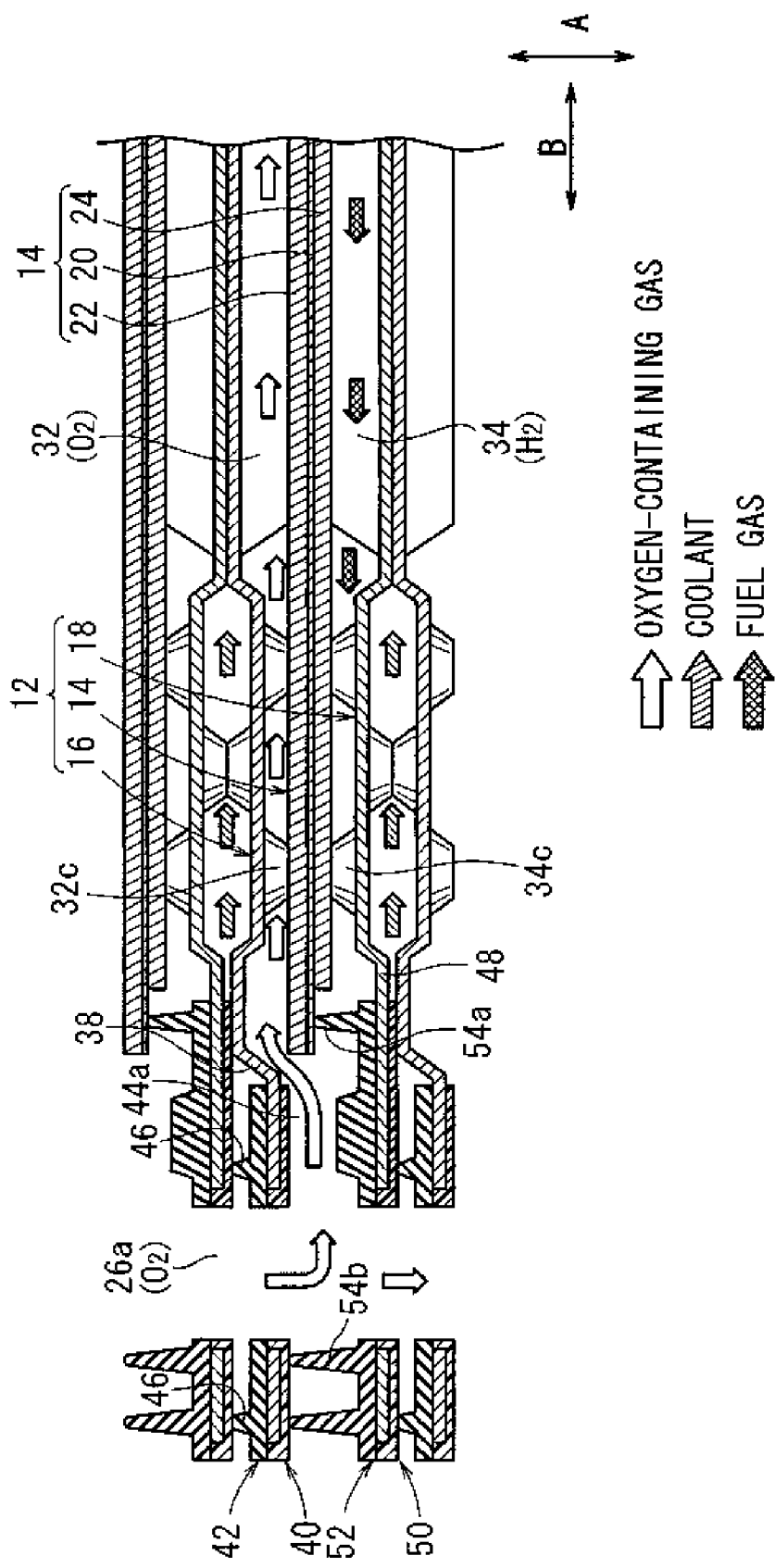
FIG. 3 is a cross sectional view showing the fuel cell, taken along a line III-III in FIG. 1.

As shown in FIGS. 2 and 3, the first metal separator 16 has a corrugated metal plate 38. A resin frame member 40 is provided on one surface (surface 16a) of the metal plate 38 to cover an end of the metal plate 38, and a rubber seal 42 is provided on the other surface (surface 16b) of the metal plate 38.

The resin frame member 40 is made of, e.g., general purpose plastic such as polyethylene (PE) or polypropylene (PP), engineering plastic such as polyamide (PA), polycarbonate (PC) or polyethylene terephthalate (PET), or super engineering plastic such as polyamide-imide (PAI), fluoroethylene resin or liquid crystal polymer (LCP). The resin frame member 40 is formed integrally on one surface of the metal plate 38 by injection molding using a forming die (not shown).

The rubber seal 42 is made of seal material such as an EPDM (Ethylene Propylene Diene Monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber. After primer is applied to the other surface of the metal plate 38 as pretreatment, the rubber seal 42 is formed integrally with the metal plate 38 by injection molding.

As shown in FIGS. 2 and 3, the resin frame member 40 is formed on a surface 16a of the first metal separator 16 around the oxygen-containing gas flow field 32, while allowing an inlet channel 44a to be connected to the oxygen-containing gas supply passage 26a, and an outlet channel 44b to be connected to the oxygen-containing gas discharge passage 26b.

As shown in FIG. 1, the rubber seal 42 includes a ridge seal 46 formed around the oxygen-containing gas supply passage 26a, the oxygen-containing gas discharge passage 26b, the fuel gas supply passage 30a, and the fuel gas discharge passage 30b, while allowing the coolant supply passage 28a and the coolant discharge passage 28b to be connected to the coolant flow field 36.

In the first metal separator 16, the oxygen-containing gas supply passage 26a, the coolant supply passage 28a, the fuel gas discharge passage 30b, the fuel gas supply passage 30a, the coolant discharge passage 28b, the oxygen-containing gas discharge passage 26b extend through the metal plate 38, the resin frame member 40, and the rubber seal 42. The second metal separator 18 described later has the same structure as the first metal separator 16.

The second metal separator 18 includes a corrugated metal plate 48. A resin frame member 50 is provided on one surface (surface 18b) of the metal plate 48 and a rubber seal 52 is provided on the other surface (surface 18a) of the metal plate 48. The resin frame member 50 has the same structure as the resin frame member 40, and the rubber seal 52 has the same structure as the rubber seal 42.

As shown in FIG. 1, the rubber seal 52 includes a first ridge seal 54a and a second ridge seal 54b. The first ridge seal 54a is formed around the fuel gas flow field 34, while allowing the fuel gas flow field 34 to be connected to the fuel gas supply passage 30a and the fuel gas discharge passage 30b, and the second ridge seal 54b is formed around the oxygen-containing gas supply passage 26a, the oxygen-containing gas discharge passage 26b, the coolant supply passage 28a, and the coolant discharge passage 28b for sealing these fluid passages.

An inlet channel 56a is formed between the fuel gas supply passage 30a and the fuel gas flow field 34, and an outlet channel 56b is formed between the fuel gas discharge passage 30b and the fuel gas flow field 34.

Operation of the fuel cell 10 will be described.

As shown in FIG. 1, an oxygen-containing gas is supplied to the oxygen-containing gas supply passage 26a, a fuel gas such as a hydrogen-containing gas is supplied to the fuel gas supply passage 30a, and a coolant such as pure water or ethylene glycol is supplied to the coolant supply passage 28a.

As shown in FIG. 3, the oxygen-containing gas supplied to the oxygen-containing gas supply passage 26a flows through the inlet channel 44a of the first metal separator 16, and the oxygen-containing gas is supplied to the oxygen-containing gas flow field 32. The oxygen-containing gas flows along the oxygen-containing gas flow field 32 in the direction indicated by the arrow B, and then, the oxygen-containing gas is discharged from the oxygen-containing gas flow field 32 into the oxygen-containing gas discharge passage 26b through the outlet channel 44b (see FIG. 1).

Figure 4:
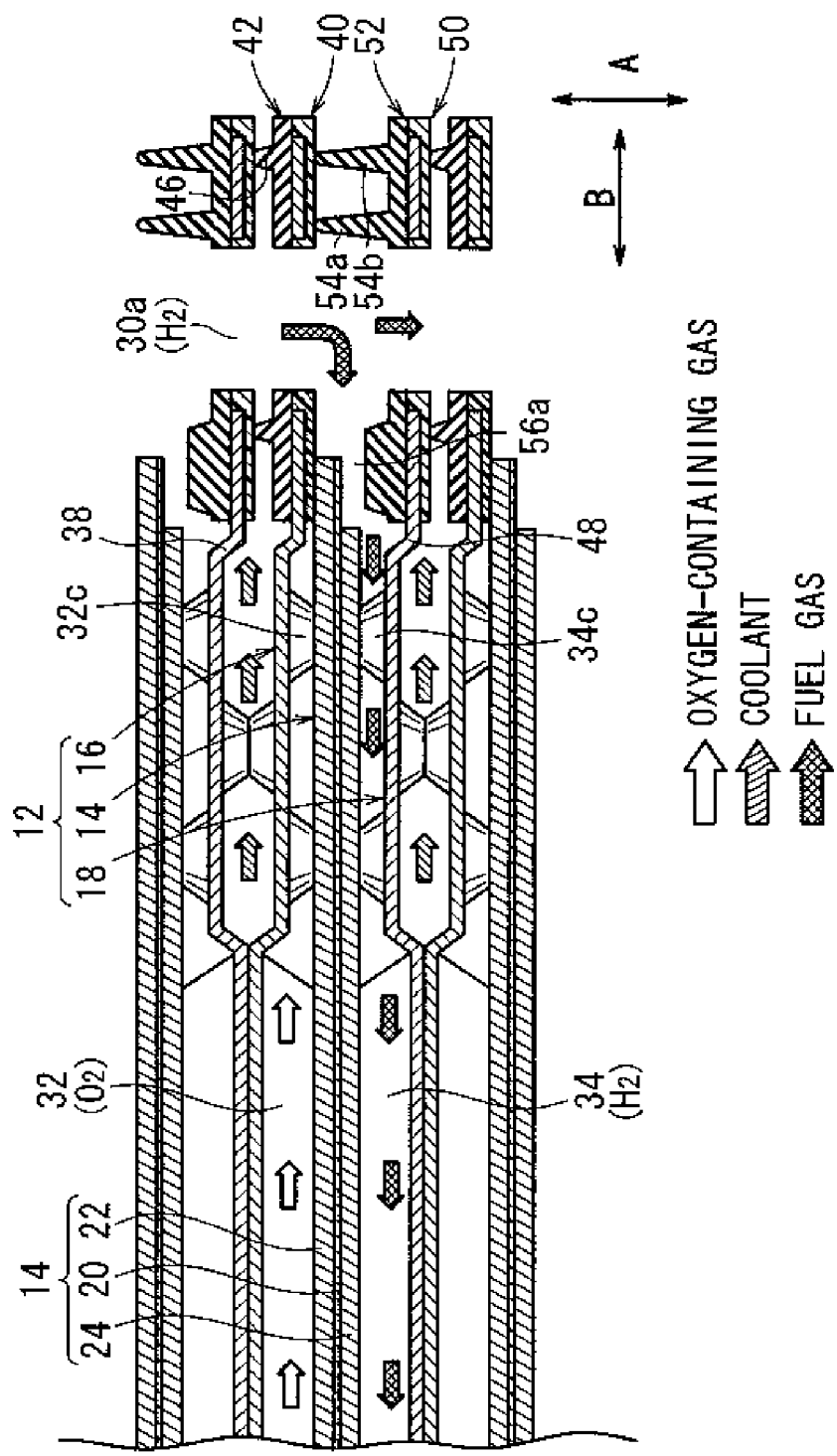
FIG. 4 is a cross sectional view showing the fuel cell, taken along a line IV-IV in FIG. 1.

As shown in FIG. 4, the fuel gas supplied to the fuel gas supply passage 30a flows through the inlet channel 56a of the second metal separator 18, and the fuel gas is supplied to the fuel gas flow field 34. The fuel gas flows along the fuel gas flow field 34 in the direction indicated by the arrow B, and then, the fuel gas is discharged from the fuel gas flow field 34 into the fuel gas discharge passage 30b through the outlet channel 56b (see FIG. 1).

Thus, in the membrane electrode assembly 14, the oxygen-containing gas supplied to the cathode 22 and the fuel gas supplied to the anode 24 are consumed in the electrochemical reactions at catalyst layers of the cathode 22 and the anode 24 for generating electricity.

Figure 5:
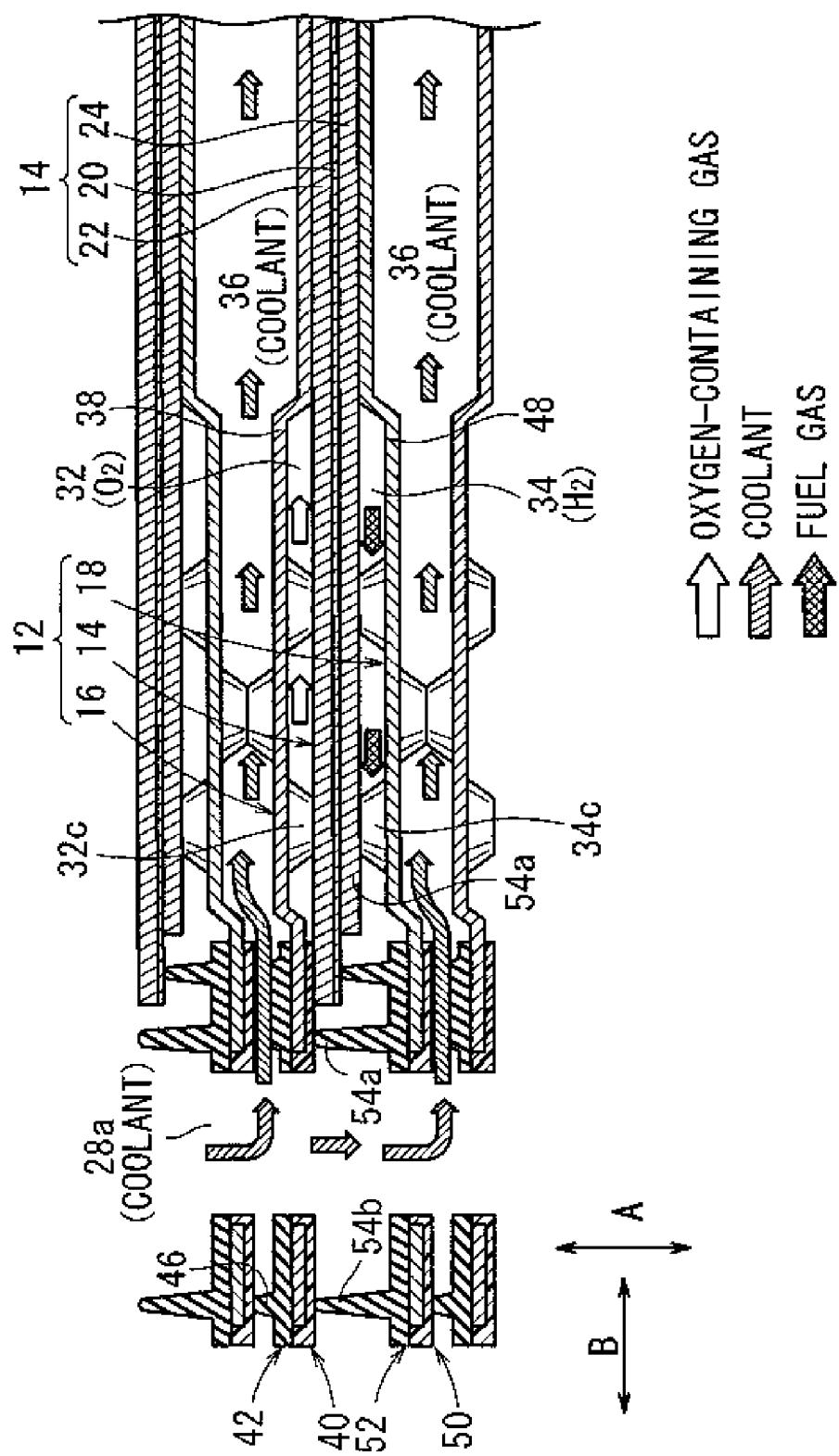
FIG. 5 is a cross sectional view showing the fuel cell, taken along a line V-V in FIG. 1.

The coolant supplied to the coolant supply passage 28a flows into the coolant flow field 36 formed between the first metal separator 16 and the second metal separator 18 (see FIG. 5). Thus, the coolant flows in the direction indicated by the arrow B to cool the membrane electrode assembly 14, and then, the coolant is discharged into the coolant discharge passage 28b (see FIG. 1).

In the first embodiment, the resin frame member 40 is provided on one surface of the metal plate 38 of the first metal separator 16, and the rubber seal 42 is provided on the other surface of the metal plate 38. In the structure, by the metal plate 38 and the resin frame member 40 of the first metal separator 16, the overall strength and durability of the first metal separator 16 are improved effectively.

Further, in the first metal separator 16, since the rubber seal 42 is provided only on one surface of the metal plate 38, the number of molding operations of LIMS required for the metal plate 38 is effectively reduced. Therefore, in particular, since it is sufficient to apply primer to only one surface as pretreatment, the time required for the rubber seal molding is significantly reduced. Further, since the cost required for applying the primer and the material cost are significantly reduced, it is possible to effectively reduce the production cost of the first metal separator 16, and efficiently produce the entire first metal separator 16 advantageously.

Further, for example, in the first metal separator 16, the oxygen-containing gas supply passage 26a, the coolant supply passage 28a, the fuel gas discharge passage 30b, the fuel gas supply passage 30a, the coolant discharge passage 28b, and the oxygen-containing gas discharge passage 26b extend through the metal plate 38, the resin frame member 40, and the rubber seal 42. Therefore, it is possible to effectively prevent the strength around the fluid passages from being lowered, and improvement in the overall rigidity of the first metal separator 16 is achieved reliably. In the second metal separator 18, the same advantages as in the case of the first metal separator 16 are obtained.

Figure 6:
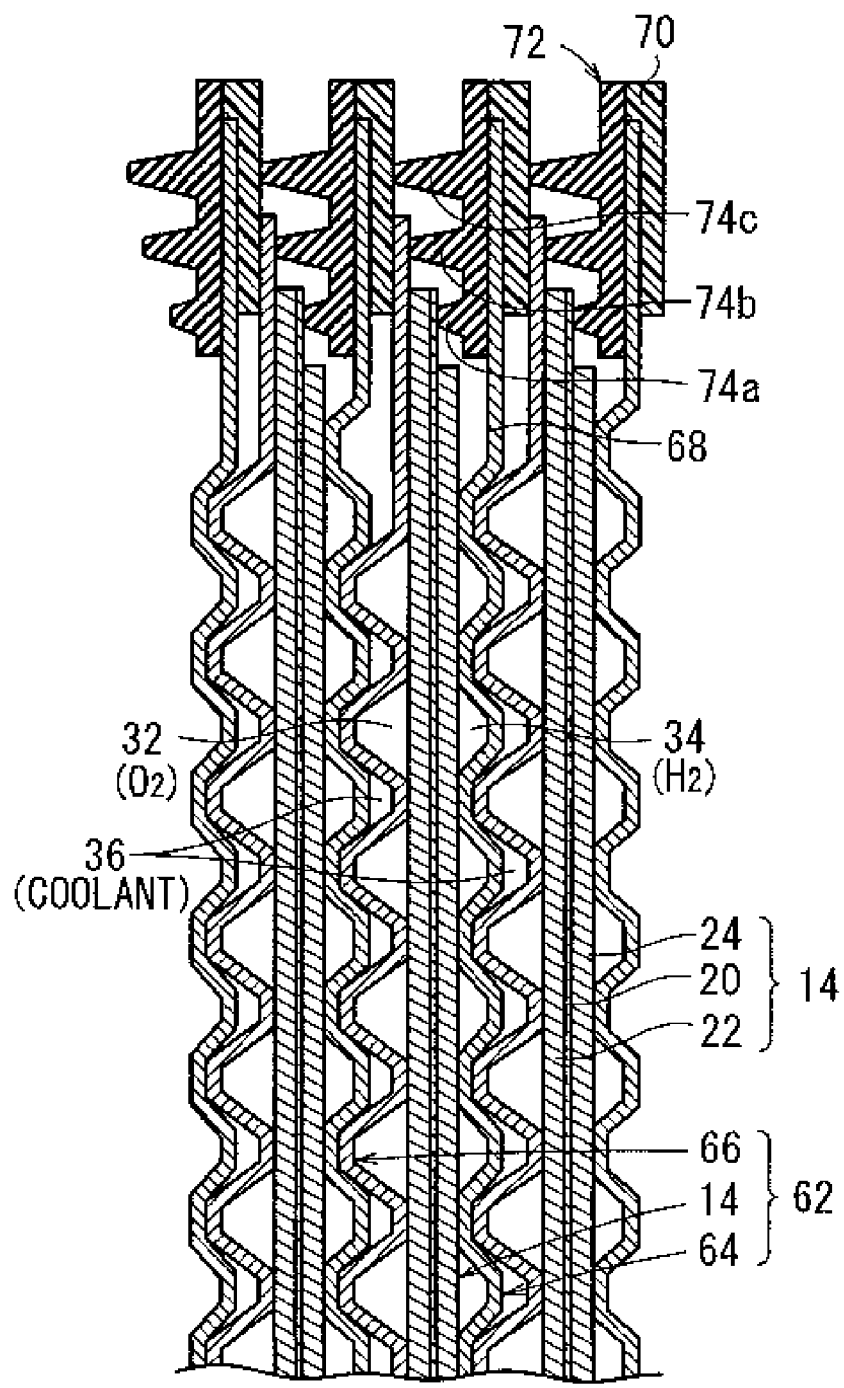
FIG. 6 is a partial cross sectional view showing a fuel cell according to a second embodiment of the present invention.

FIG. 6 is a partial cross sectional view showing a fuel cell 60 according to a second embodiment of the present invention.

The constituent elements that are identical to those of the fuel cell 10 according to the first embodiment are labeled with the same reference numerals, and detailed description will be omitted. Further, also in third and fourth embodiments, the constituent elements that are identical to those of the fuel cell 10 according to the first embodiment are labeled with the same reference numerals, and detailed description will be omitted.

The fuel cell 60 is formed by stacking a plurality of power generation cells 62 in a direction indicated by an arrow A. Each of the power generation cells 62 includes a membrane electrode assembly 14 and a first metal separator 64 and a second metal separator 66 sandwiching the membrane electrode assembly 14. The outer dimensions of the first metal separator 64 are larger than the outer dimensions of the second metal separator 66.

The first metal separator 64 includes a metal plate 68, and a resin frame member 70 is provided on one surface of the metal plate 68 (surface facing the second metal separator 66 of the adjacent power generation cell 62). A rubber seal 72 is provided on the other surface of the metal plate 68 (surface facing the membrane electrode assembly 14).

The rubber seal 72 includes a first ridge seal 74a, a second ridge seal 74b, and a third ridge seal 74c. The first ridge seal 74a is provided outside (around) the anode 24 of the membrane electrode assembly 14, and directly contacts the solid polymer electrolyte membrane 20. The second ridge seal 74b is provided outside (around) the membrane electrode assembly 14, and directly contacts the second metal separator 66. The third ridge seal 74c is provided outside (around) the second metal separator 66, and contacts the resin frame member 70 of the first metal separator 64 of the adjacent power generation cell 62.

The first ridge seal 74a forms a fuel gas seal, the second ridge seal 74b forms an oxygen-containing gas seal, and the third ridge seal 74c forms a coolant seal. The first ridge seal 74a, the second ridge seal 74b, and the third ridge seal 74c are offset from each other in the stacking direction.

In the second embodiment, the rubber seal 72 provided on one surface of the first metal separator 64 includes the first ridge seal 74a, the second ridge seal 74b, and the third ridge seal 74c on the same plane. Thus, the seal height is maintained effectively, and durability of the rubber seal 72 is improved advantageously.

Figure 7:
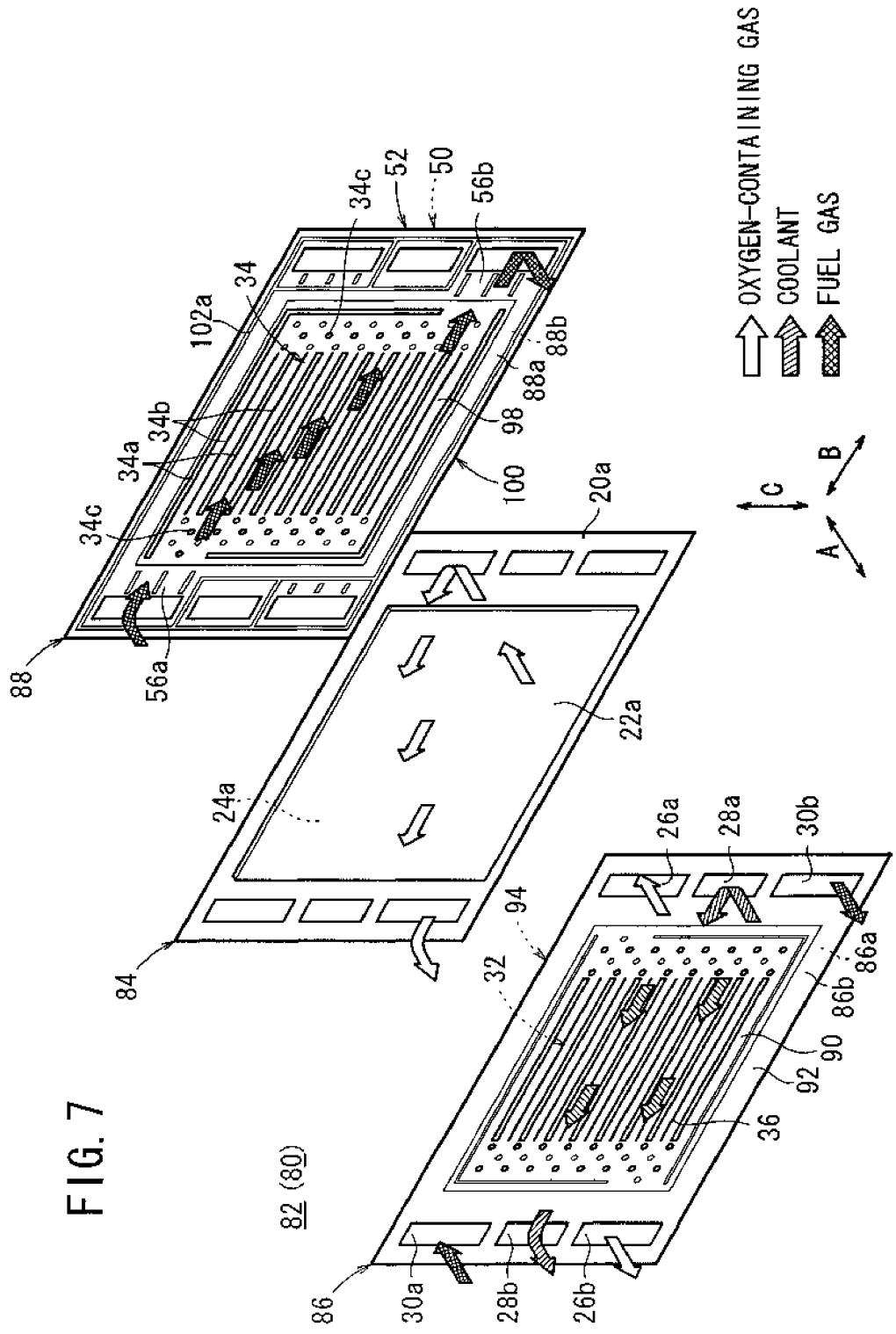
FIG. 7 is an exploded perspective view showing a power generation cell of a fuel cell according to a third embodiment of the present invention.

FIG. 7 is an exploded perspective view showing a power generation cell 82 of a fuel cell 80 according to a third embodiment of the present invention.

The power generation cell 82 is formed by sandwiching a membrane electrode assembly 84 between a first metal separator 86 and a second metal separator 88. The membrane electrode assembly 84 includes a cathode 22a, an anode 24a, and a solid polymer electrolyte membrane 20a interposed between the cathode 22a and the anode 24a. The surface areas of the cathode 22a and the anode 24a are smaller than the surface area of the solid polymer electrolyte membrane 20a.

The first metal separator 86 includes a corrugated metal plate 90. A resin frame member 92 is provided on one surface of the metal plate 90, i.e., on the surface where the coolant flow field 36 is formed, and a rubber seal 94 is formed on the other surface of the metal plate 90, i.e., on the surface where the oxygen-containing gas flow field 32 is formed (see FIGS. 7 to 9).

Figure 8:
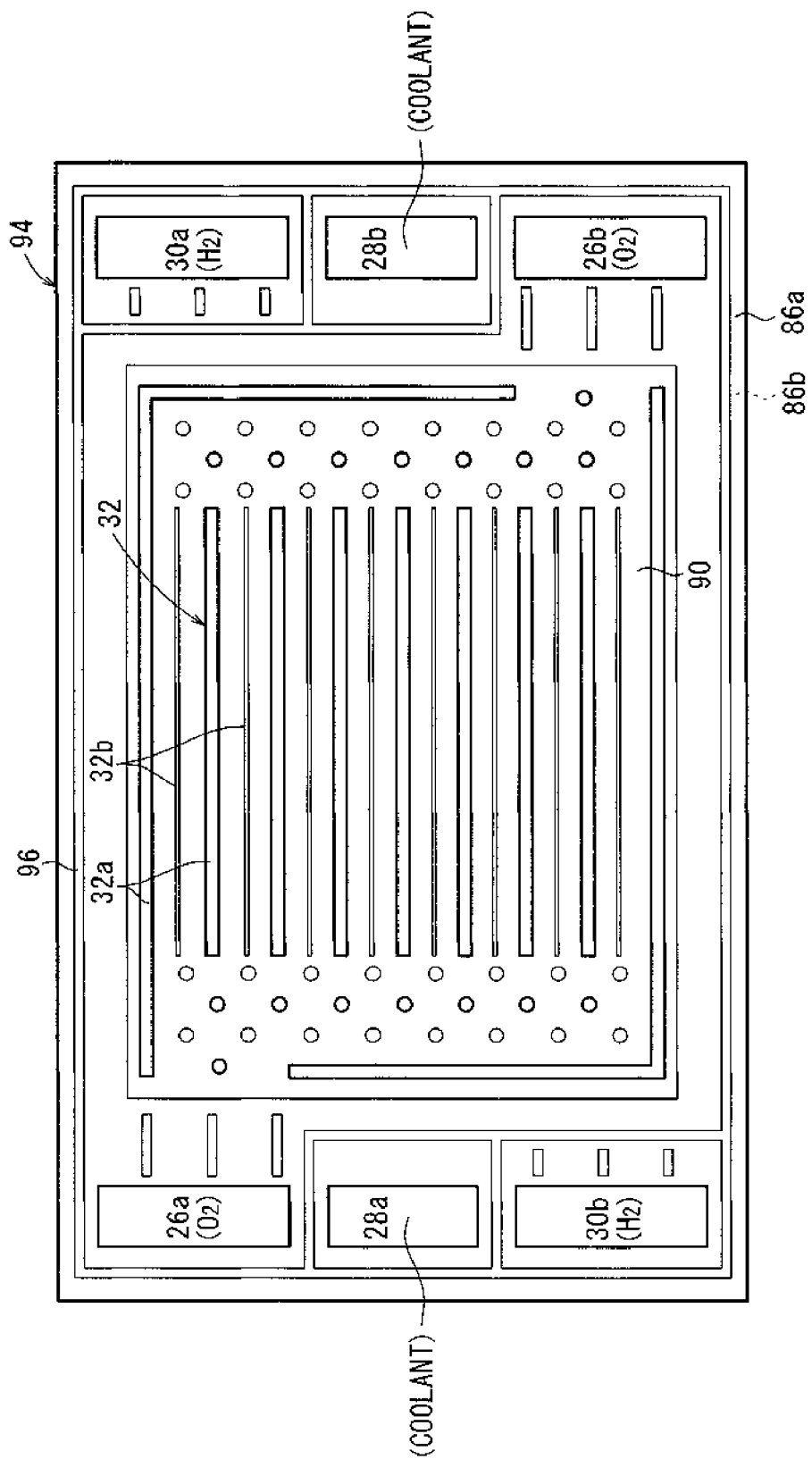
FIG. 8 is a front view showing a first metal separator of the power generation cell.
Figure 9:
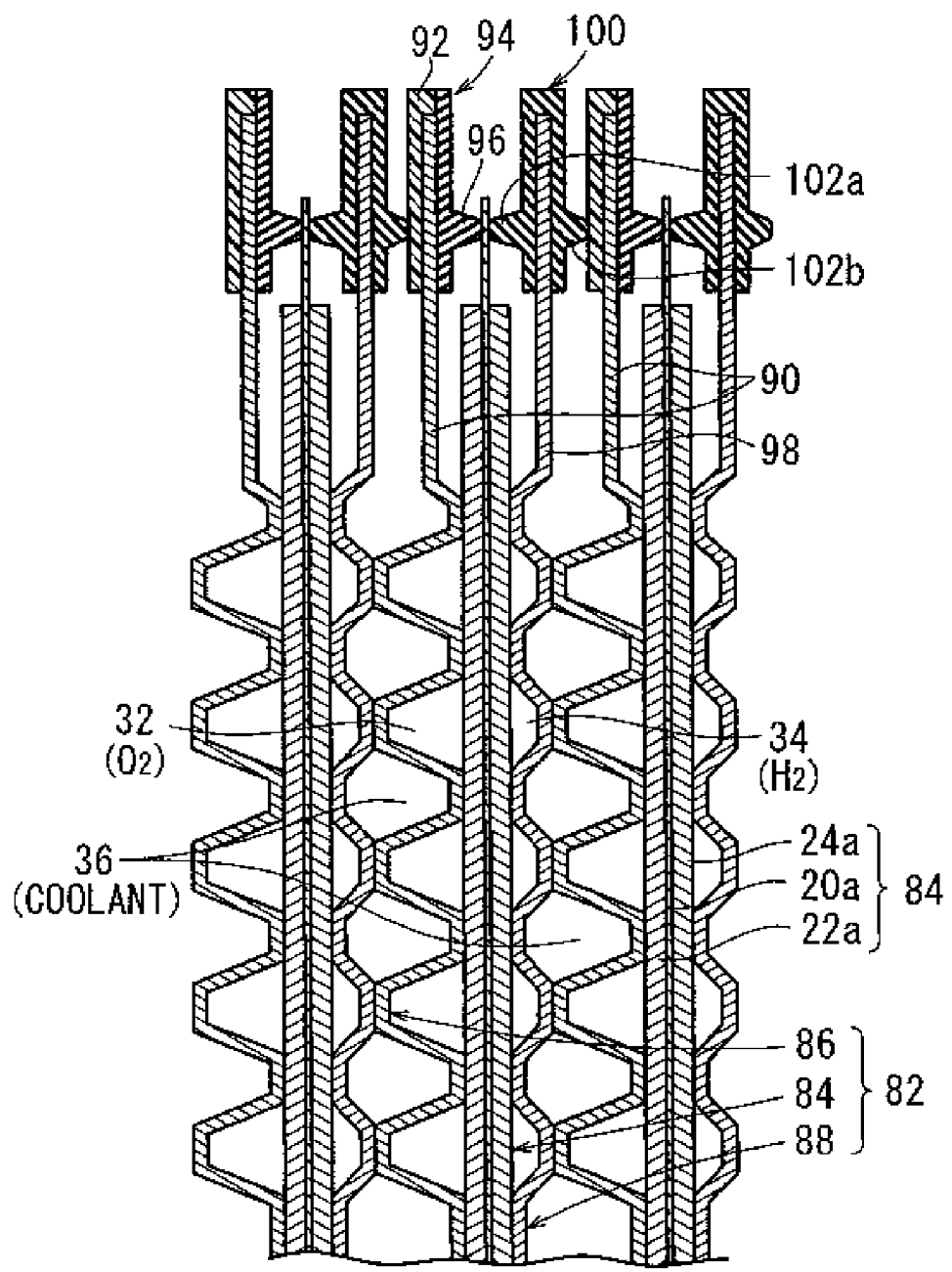
FIG. 9 is a cross sectional view showing main components of the fuel cell.

As shown in FIGS. 8 and 9, the rubber seal 94 includes a ridge seal 96 formed around the fuel gas supply passage 30a, the coolant discharge passage 28b, the coolant supply passage 28a, and the fuel gas discharge passage 30b, while allowing the oxygen-containing gas supply passage 26a and the oxygen-containing gas discharge passage 26b to be connected to the oxygen-containing gas flow field 32.

The second metal separator 88 includes a metal plate 98, and a rubber seal 100 is integrally formed on both surfaces of the metal plate 98. A first ridge seal 102a is provided on one surface of the rubber seal 100, and a second ridge seal 102*b* is provided on the other surface of the rubber seal 100. The first ridge seal 102*a* allows the fuel gas supply passage 30*a* and the fuel gas discharge passage 30*b* to be connected to the fuel gas flow field 34, and the second ridge seal 102*b* allows the coolant supply passage 28*a* and the coolant discharge passage 28*b* to be connected to the coolant flow field 36.

In the third embodiment, in the first metal separator 86, the resin frame member 92 is provided on one surface of the metal plate 90, and the rubber seal 94 is provided on the other surface of the first metal separator 86. Thus, the same advantages as in the case of the first embodiment are obtained.

Figure 10:
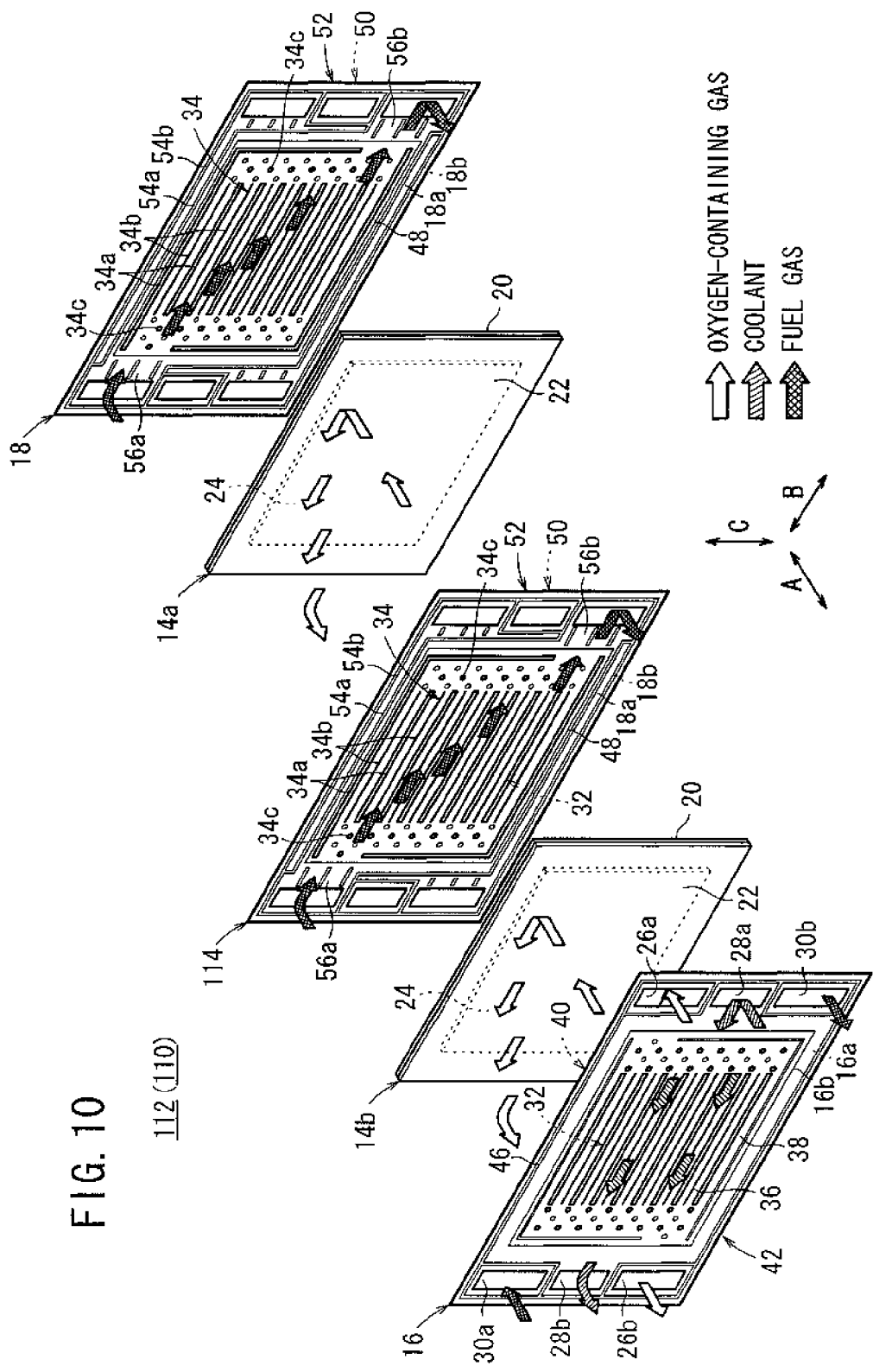
FIG. 10 is an exploded perspective view showing a power generation cell unit of a fuel cell according to a fourth embodiment of the present invention.
Figure 11:
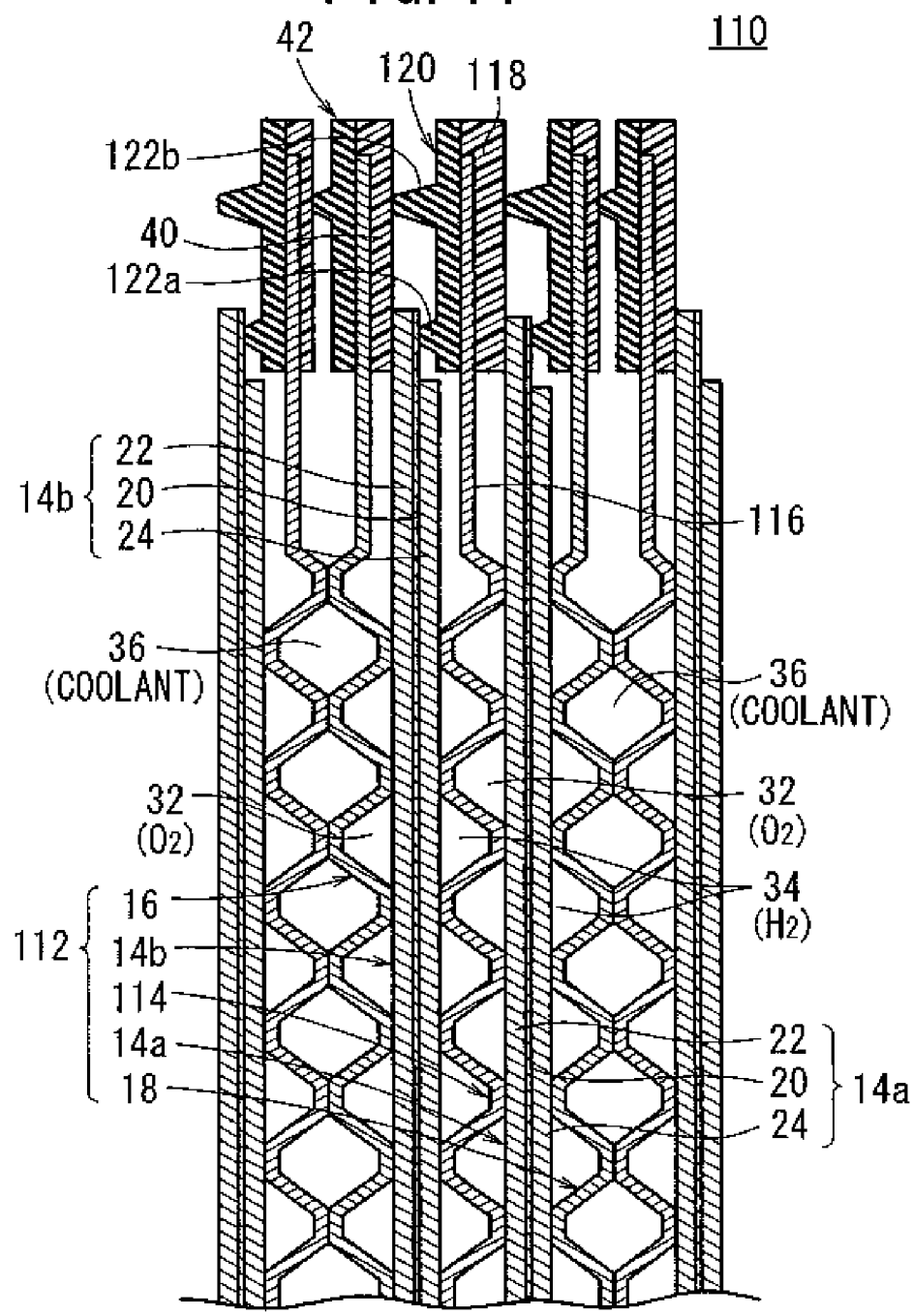
FIG. 11 is a cross sectional view showing main components of the fuel cell.
Figure 12:
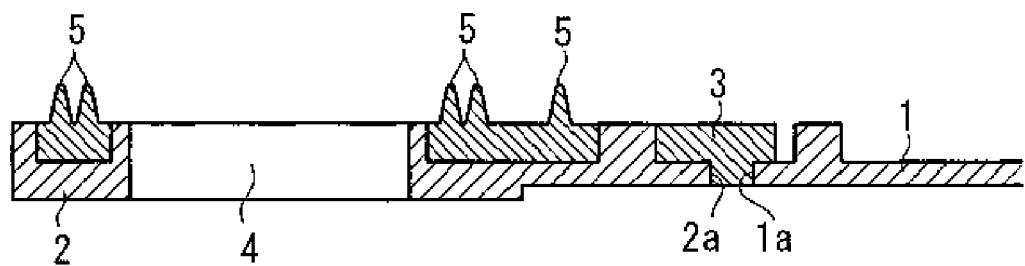
FIG. 12 is a view showing a conventional separator.

FIG. 10 is an exploded perspective view showing a power generation cell unit 112 of a fuel cell 110 according to a fourth embodiment of the present invention. FIG. 11 is a cross sectional view showing main components of the fuel cell 110.

The fuel cell 110 is formed by modifying the fuel cell 10 according to the first embodiment, by forming the coolant flow field 36 for a plurality of, e.g., for every two membrane electrode assemblies 14, to adopt, so called, skip cooling structure. The power generation cell unit 112 is formed by stacking a second metal separator 18, a membrane electrode assembly 14*a*, an intermediate metal separator 114, a membrane electrode assembly 14*b*, and a first metal separator 16 in a direction indicated by an arrow A.

The intermediate metal separator 114 has an oxygen-containing gas flow field 32 on a surface facing the membrane electrode assembly 14*a*, and a fuel gas flow field 34 on a surface facing the membrane electrode assembly 14*b*. The intermediate metal separator 114 includes a metal plate 116. A resin frame member 118 is provided on a surface of the metal plate 116 facing the oxygen-containing gas flow field 32, and a rubber seal 120 is provided on a surface of the metal plate 116 facing the fuel gas flow field 34.

The rubber seal 120 forms a fuel gas seal, and includes a first ridge seal 122*a* and a second ridge seal 122*b*. The first ridge seal 122*a* contacts the outer end of the solid polymer electrolyte membrane 20 of the membrane electrode assembly 14*b*. The second ridge seal 122*b* is provided outside (around) the membrane electrode assembly 14*b*, and contacts the resin frame member 40 of the first metal separator 16.

In the fourth embodiment, the resin frame member 40, 50, and 118 are provided on the surfaces of the first metal separator 16, the second metal separator 18, and the intermediate metal separator 114 on one side, and the rubber seals 42, 52, and 120 are provided on the other surfaces of the first metal separator 16, the second metal separator 18, and the intermediate metal separator 114 on the other side. Thus, the same advantages as in the case of the first embodiment are obtained.

While the invention has been particularly shown and described with reference to the preferred embodiments, it will be understood that variations and modifications can be effected thereto by those skilled in the art without departing from the spirit and scope of the invention as defined by the appended claims.

What is claimed is:

1. A fuel cell formed by sandwiching an electrolyte electrode assembly between a first metal separator and a second metal separator, the electrolyte electrode assembly including a pair of electrodes, and an electrolyte interposed between the electrodes, wherein the first metal separator includes a metal plate and the second metal separator includes a metal plate;

a resin frame member is provided on one surface of the metal plate of the first metal separator; and a rubber seal is provided on the other surface of the metal plate of the first metal separator; and a resin frame member is provided on one surface of the metal plate of the second metal separator to contact the rubber seal of the metal plate of the first metal separator adjacent to the second metal separator.

2. A fuel cell according to claim 1, wherein in the first metal separator, fluid passages extend through the metal plate, the resin frame member, and the rubber seal as passages for reactant gases and a coolant in a stacking direction.

3. A fuel cell according to claim 1, wherein the rubber seal includes a fuel gas seal, an oxygen-containing gas seal, and a coolant seal; and the fuel gas seal, the oxygen-containing gas seal, and the coolant seal are offset from each other in a stacking direction.

4. A fuel cell according to claim 1, wherein a rubber seal is provided on the other surface of the metal plate of the second metal separator to face the resin frame member of another first metal separator adjacent to the second metal separator.

5. A fuel cell according to claim 4, wherein the rubber seal includes a ridge seal which contacts the resin frame member facing the rubber seal.

\* \* \* \* \*